(12) United States Patent
Avital et al.

(10) Patent No.: US 7,039,134 B1
(45) Date of Patent: May 2, 2006

(54) REDUCED COMPLEXITY CORRELATOR FOR USE IN A CODE DIVISION MULTIPLE ACCESS SPREAD SPECTRUM RECEIVER

(75) Inventors: Yaniv Avital, Jerusalem (IL); Ehud Reshef, Qiryat Tivon (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 747 days.

(21) Appl. No.: 10/050,968

(22) Filed: Jan. 22, 2002

(51) Int. Cl.
*H04L 27/06* (2006.01)

(52) U.S. Cl. .................. 375/343; 375/143; 375/148; 375/140

(58) Field of Classification Search ............... 375/343, 375/140, 143, 148
See application file for complete search history.

(56) References Cited

U.S. PATENT DOCUMENTS

| | | | | |
|---|---|---|---|---|
| 5,117,232 A * | 5/1992 | Cantwell | ............... | 342/357.12 |
| 5,500,856 A | 3/1996 | Nagase et al. | ............... | 370/441 |
| 5,768,306 A | 6/1998 | Sawahashi et al. | ......... | 375/150 |
| 5,991,332 A | 11/1999 | Lomp et al. | ................ | 375/152 |
| 6,005,889 A * | 12/1999 | Chung et al. | ............... | 375/140 |
| 6,173,008 B1 * | 1/2001 | Lee | ............................ | 375/148 |
| 6,501,788 B1 * | 12/2002 | Wang et al. | ................ | 375/148 |
| 6,539,048 B1 * | 3/2003 | Hakala | ........................ | 375/143 |
| 6,650,689 B1 * | 11/2003 | Oishi et al. | ................. | 375/142 |
| 6,707,844 B1 * | 3/2004 | Imaizumi et al. | .......... | 375/148 |
| 6,813,262 B1 * | 11/2004 | Lee et al. | ................... | 370/342 |

OTHER PUBLICATIONS

L. Harju, M. Kuulusa, and J. Nurmi, A Flexible Rake Receiver Architecture for WCDMA Mobile Terminals, Third IEEE Signal Processing Workshop on Signal Processing Advances in Wireless Communications, Mar. 20-23, 2001.

* cited by examiner

*Primary Examiner*—Stephen Chin
*Assistant Examiner*—Jaison Joseph
(74) *Attorney, Agent, or Firm*—Zaretsky & Associates PC; Howard Zaretsky

(57) ABSTRACT

A reduced complexity correlator that enables the re-use of the most complex portions of a correlator, namely the multiplier and adder. The correlator of the present invention is especially well-suited for use in CDMA and W-CDMA spread spectrum communication systems that require the use of numerous correlators in their operation. Multiple input samples, multiple codes and integration results are stored in shift registers and circularly shifted and clocked out at appropriate clock rates such that the multiplication and accumulation steps of the correlation process are synchronized.

34 Claims, 8 Drawing Sheets

REDUCED COMPLEXITY CORRELATOR FOR USE IN A CODE DIVISION MULTIPLE ACCESS SPREAD SPECTRUM RECEIVER

FIELD OF THE INVENTION

The present invention relates generally to data communication systems and more particularly relates to a reduced complexity correlator suitable for use in a Code Division Multiple Access (CDMA) spread spectrum receiver.

BACKGROUND OF THE INVENTION

Currently, worldwide demand for wireless services is growing at an ever quickening pace. This demand is not only for an increased number of users but also for extended wireless access capabilities. These capabilities include for example, Internet access, video conferencing and multimedia applications.

Code Division Multiple Access (CDMA) and Wideband-CDMA (W-CDMA) are spread spectrum based broadband communications technologies that are becoming increasingly popular in mobile wireless communication systems and, in particular, for 3G mobile systems currently under development. In a CDMA system, all users simultaneously occupy the same frequency. In contrast, users in Frequency Division Multiple Access (FDMA) systems communicate over separate frequencies. Users in Time Division Multiple Access (TDMA) systems receive and transmit data during separate predefined time slots. CDMA systems, however, discriminate between users by assigning a different code for each user. In the downlink, CDMA base stations simultaneously transmit signals to multiple subscriber mobile stations over a single frequency band whereby each signal is generated using a different code associated with each user. Several advantages of CDMA systems over other multiple access systems such as FDMA and TDMA systems include greatly increased spectral efficiently and the ability to reduce the affects of signal fading by making use of known path diversity techniques.

In a W-CDMA base station, each information signal associated with a mobile station is multiplied by a unique spreading code sequence. The spreading code sequence is formed by concatenating (i.e. multiplying) a particular scrambling code together with a channelization code unique to each mobile station. Note that in W-CDMA, relatively long scrambling codes (38,400 chips) are concatenated with short channelization codes resulting in the spreading code used to modulate the information traffic. Examples of long codes include complex or non-complex Gold sequences, PN sequences or maximal length sequences. Examples of short codes include Orthogonal Variable Spreading Factor (OVSF), Walsh or Hadamard codes. Multiplication of the information signal by the spreading code sequence creates the spreading of the signal spectrum by increasing the rate of transmission from the bit rate to the chip rate. The spread signals for all users are transmitted simultaneously by the base station.

A W-CDMA signal is de-spread by correlating the received signal with the known spreading sequence. The results are adequate as long as the influence of other users can be neglected. The influence between users is reduced by choosing the spreading codes so that the cross correlation between different codes and multipath delays is low (e.g., Gold, OVSF codes).

At each mobile station, a receiver de-spreads the received signal by multiplying the received signal by the code sequence assigned to the receiver. The de-spreading is accomplished using a correlator which functions to generate the information signal intended for the particular mobile station. The correlator operation is such that signals encoded with other user's codes intended for other mobile stations appear at the output of the correlator as noise.

The structure and operation of spread spectrum systems are well known. See, for example, Robert C. Dixon, "Spread Spectrum Systems," John Wiley & Sons, 1984. In addition, the structure and operation of CDMA systems are well known. See, for example, Andrew J. Viterbi, "CDMA: Principles of Spread Spectrum Communication," Addison-Wesley Publishing, 1995.

The use of W-CDMA has been proposed for applications requiring higher bandwidth such as multimedia applications. W-CDMA achieves higher data rates by using higher chip rates for the spreading waveform resulting in a higher ratio of chip rate to information rate. Considering that the main interference in a W-CDMA system is from other users, the increased spreading factor or processing gain allows for improved handling of higher interference levels, which translates to a higher number of users that can be supported in the same cell. In addition, the reduced chip period results in more multipath components being separated by at least one chip period making more paths available to be resolved by the receiver.

In CDMA systems and especially W-CDMA systems, rake receivers are typically employed to combat multipath interference. A rake receiver exploits the path diversity present in the input RF signal. The transmitted signal typically travels to the receiver over a channel that includes many independent paths or multipaths. Each multipath represents a separate route the signal took in traveling from the transmitter to the receiver. A plurality of multipath signals arrive at the receiver with each multipath having a different delay, phase and signal strength due to the fading present in the channel.

Narrowband multiple access techniques such as FDMA and TDMA cannot discriminate between the individual multipath signals that arrive at the receiver because their symbol transmission times are too long, meaning their duration is relatively long making it impossible to discriminate between individual multipath components. Instead, these systems resort to equalization to combat the negative effects of multipath interference.

The function of the rake receiver in a W-CDMA system is to discriminate between individual multipath signal components, demodulate them and combine them to produce a stronger output signal. Separate fingers are used to receive and demodulate the different multipath signals. The energy received from each finger is combined resulting in a stronger received signal. A searcher functions to search for the strongest multipath signals and assigns the fingers to those multipath components.

In a rake receiver, a single finger may be required to perform several correlations. Typically, these include correlations of a given code with several adjacent signal phases (e.g., early, on-time and late). If a common pilot channel is included in the transmission, it is used to perform channel estimation in addition to receiving the data signal. The common pilot channel must be processed for each data signal using a different phase and delay similar to the processing for the data signal. Thus, there is a need to allocate the same number of fingers for pilot signal processing as for data channels. In the event many data signals are transmitted, the channel estimation processing requires numerous correlations as well. Many correlations are also required in the case when several data signals have the same phase and delay but use different codes. The number of correlators required increases linearly as the number of unique codes, phases and delays the input signal is to be correlated against increases.

A block diagram of a prior art W-CDMA rake receiver comprising a plurality of fingers is shown in FIG. 1. The receiver, generally referenced 10, comprises a plurality of fingers 12. Each finger is configured to process a different multipath component and comprises an independent correlator. The correlator comprises a multiplier 14 adapted to multiply the input Rx signal by a spreading code 20. The multiplication result is then integrated over the symbol duration, i.e. the spreading factor, via adder 16 and register 18 functioning as an accumulator. It is important to note that the multiplier and adder is duplicated in each finger. Thus, N fingers requires N multipliers and N adders to construct.

Prior art implementations of rake receiver fingers require allocating individual correlators for each signal having different phase, delay, code, pilot channel, etc. The need for such a large number of correlators requires the allocation of sufficient hardware processing resources, e.g., gate count, chip count, etc., with the resultant increase in power consumption, size, cost and complexity and a consequent decrease in reliability.

There is thus a need for a reduced complexity correlation mechanism capable of performing a plurality of correlations that does not require considerable additional hardware as the number of correlations required increases. In addition, the correlator should be capable of reusing one or more correlator components thus greatly reducing the number of required gates to construct the correlator.

SUMMARY OF THE INVENTION

The present invention is a reduced complexity correlator that enables the re-use of the most complex portions of a correlator, namely the multiplier and adder. The correlator of the present invention is especially suited for use in CDMA and W-CDMA spread spectrum communication systems. The invention is capable of performing multiple correlations in a variety of different configurations depending on the requirements of the particular application.

In one embodiment, the correlator is adapted to correlate an input Rx signal sampled at an over-sampling rate with a single code wherein multiple correlations are performed for each over-sampling phase within the nominal sample period. Separate integration result registers are employed to store the individual correlation sums.

In another embodiment, the input samples are correlated with any number of codes. The codes are stored within a circular shift register and clocked at a sufficiently high rate such that each input sample is multiplied with each code within a sample period. A corresponding number of integration result registers are used to accumulate and store the correlation sums.

In another embodiment, multiple input sample streams are correlated with multiple codes. The input samples are parallel loaded into a circular input sample shift register similar to that of the plurality of codes. The input samples and codes are clocked out at a suitable clock rate so as to multiply every input sample in the sample shift register with every code in the code shift register. The correlation sums are stored in an integration result shift register and clocked out when integration is complete.

A common feature of the correlator of the present invention in all embodiments is the use or a single multiplier and a single adder regardless of the number of number of input samples and codes required to be correlated. Thus a major advantage of the invention is the ability to reuse the most complex parts of the correlator, namely the multiplier and adder. This results in the ability to achieve lower gate counts in the realization of the rake receiver fingers in spread spectrum receivers.

Note that many aspects of the invention described herein may be constructed as software objects that execute in embedded devices as firmware, software objects that execute as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention a correlator for correlating an input signal with a code comprising a sample register adapted to store and output E input samples every chip period of an input sample stream clocked at an over sampling ratio of R times a nominal sampling clock rate, a code register adapted to store and output a code value at the nominal sampling clock rate, a multiplier coupled to the sample register and the code register, the multiplier adapted to multiply the output of the sample register with the output of the code register, an adder adapted to add the output of the multiplier with the correlation sum output of the last stage of an M-stage integration result shift register and to produce a correlation sum therefrom, the integration results shift register adapted to store M correlation sums wherein correlation sums output of the adder are shifted into the integration results shift register at the over sampling clock rate such that the over sampling phase of the correlation sum at the output of the integration results shift register corresponds to the correlation sum currently at the input to the adder and wherein E, R and M are positive integers.

There is also provided in accordance with the present invention a correlator for correlating input samples with a plurality of codes comprising a sample register adapted to store and output input samples at a first clock rate, an N-stage circular code shift register adapted to store N code values and clocked at a second clock rate, a multiplier coupled to the sample register and the code shift register, the multiplier for multiplying input samples with the code value output of the last stage of the code shift register, wherein the code shift register is circularly shifted such that each input sample is sequentially multiplied by each of N codes, an adder adapted to add the output of the multiplier with the correlation sum output of the last stage of an M-stage integration-result shift register and to produce a correlation sum therefrom, the integration results shift register adapted to store M correlation sums wherein correlation sums output of the adder are shifted into the integration results shift register at the second clock rate such that the correlation sum at the output of the integration results shift register corresponds to that of the correlation sum currently at the input to the adder and wherein N and M are positive integers.

There is further provided in accordance with the present invention a rake receiver for use in a Code Division Multiple Access (CDMA) spread spectrum communications system comprising a radio frequency (RF) front end circuit for receiving a spread spectrum RF signal having a plurality of multipath components, a searcher adapted to measure the multipath components of the RF signal and to generate one or more path selections in accordance thereto, a collapsed finger bank for generating a plurality of demodulated signals from the RF signal in accordance with the path-selections, the collapsed finger bank comprising a sample register adapted to store and output input samples at a first clock rate, an N-stage circular code shift register adapted to store N code values and clocked at a second clock rate, a multiplier coupled to the sample register and the code shift register, the multiplier for multiplying input samples with the code value output of the last stage of the code shift register, wherein the code shift register is circularly shifted such that each input sample is sequentially multiplied by each of N codes, an adder adapted to add the output of the multiplier with the correlation sum output of the last stage of an M-stage integration result shift register and to produce a correlation sum therefrom, the integration results shift register adapted to store M correlation sums wherein correlation sums output of the adder are shifted into the integration results shift register at the second clock rate such that the correlation sum at the output of the integration results shift register corresponds to that of the correlation sum currently at the input to the adder, a results register adapted to store final correlation sums output of the integration results register and to output the final correlation sums as demodulated signals, wherein N and M are positive integers, a channel estimation unit adapted to generate channel estimates of one or more pilot signals and a combiner coupled to the output of the collapsed finger bank and adapted to combine the demodulated signals output therefrom to generate a receive data output signal in accordance with the channel estimates.

There is also provided in accordance with the present invention a method of correlating a first plurality of input samples with a second plurality of codes, the method comprising the steps of receiving and storing input samples in an input sample register at a first clock rate, receiving and storing N code values in a circular code shift register and outputting the code values at a second clock rate, multiplying the input samples with the code value output of the last stage of the code shift register to generate multiplication results, wherein the code shift register is circularly shifted such that each input sample is sequentially multiplied by each of N codes, adding each multiplication result to its corresponding correlation sum, storing M correlation sums in an M-stage integration result shift register and shifting the wherein correlation sums output of the adder into the integration results shift register at the second clock rate such that the correlation sum at the output of the integration results shift register corresponds to that of the correlation sum currently being added and wherein N and M are positive integers.

There is still further provided in accordance with the present invention a multiply and accumulate (MAC) apparatus for multiplying two signals and accumulating the results thereof comprising input storage means adapted to store and output first input samples, second storage means adapted to store and circularly rotate a plurality of second input samples, multiplier means coupled to the first storage means and the second storage means and adapted to multiply the output of the input storage means by the output of the second storage means, wherein the second storage means is circularly rotated such that each first input sample is sequentially multiplied with the plurality of second input samples, result storage means adapted to simultaneously store and output one or more MAC results in a first-in first-out manner, summing means adapted to add the output of the multiplier means with the MAC result output of the result storage means to produce an updated MAC result therefrom, the updated MAC result input to the result storage means and wherein the second storage means and the result storage means are adapted such that the MAC product from the multiplier means present at a first input to the summing means corresponds to the MAC result output from the result storage means present at a second input to the summing means.

BRIEF DESCRIPTION OF THE DRAWINGS

The invention is herein described, by way of example only, with reference to the accompanying drawings, wherein.

DETAILED DESCRIPTION OF THE INVENTION

Figure 1:
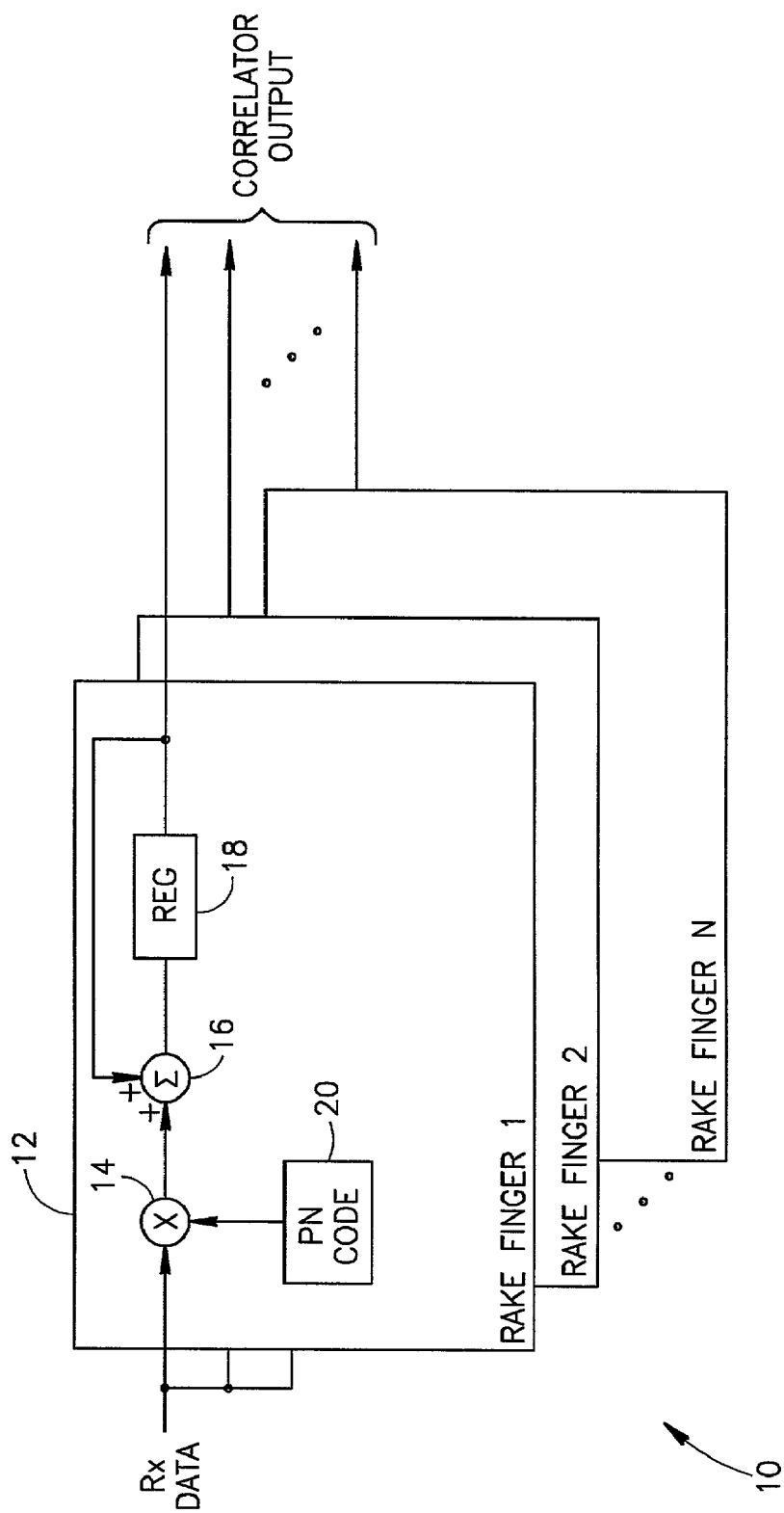
FIG. 1 is a block diagram of a prior art CDMA rake receiver comprising a plurality of fingers.

Notation Used Throughout
The following notation is used throughout this document.

| Term | Definition |
| --- | --- |
| ASIC | Application Specific Integrated Circuit |
| BPF | Band Pass Filter |
| CDMA | Code Division Multiple Access |
| CODEC | Coder/Decoder |
| CRC | Cyclic Redundancy Code |
| FDMA | Frequency Division Multiple Access |
| FEC | Forward Error Correction |
| FPGA | Field Programmable Gate Array |
| HDL | Hardware Description Language |
| MAC | Multiply and Accumulate |
| MRC | Maximal Ratio Combining |
| OVSF | Orthogonal Variable Spreading Factor |
| PN | Pseudo random Noise |
| RCC | Reduced Complexity Correlator |
| RF | Radio Frequency |
| SF | Spreading Factor |
| SIR | Signal to Interference Ratio |
| SNR | Signal to Noise Ratio |
| TDMA | Time Division Multiple Access |
| W-CDMA | Wideband Code Division Multiple Access |

DETAILED DESCRIPTION OF THE INVENTION

The present invention is a reduced complexity correlator that enables the re-use of the most complex portions of a correlator, namely the multiplier and adder. The correlator of the present invention is especially suited for use in CDMA and W-CDMA spread spectrum communication systems. The invention is capable of performing multiple correlations in a variety of different configurations depending on the requirements of the particular application.

A major feature of the correlator of the present invention is that only a single multiplier and adder are used regardless of the number of correlations to be computed. Depending on the configuration implementation, the correlator of the present invention is capable of performing correlations on multiple input sample data streams against multiple codes. Separate correlation sums are calculated and integrated over the duration of a symbol. The correlation results are then sequentially read out from a result register once integration is complete.

The correlation mechanism of the present invention is particularly useful in spread spectrum communication systems wherein receive input signals must be correlated with many different codes. The invention 'collapses' the multiple correlators that would normally be required into a single correlation machine wherein the complex parts are reused to perform each correlation. Specifically, the invention is applicable in CDMA and W-CDMA systems for both data traffic and channel estimation from pilot signals.

It is noted that the present invention is not limited to use with any particular code. Throughout this document the invention is described in reference to W-CDMA codes but it is not limited for use with only these codes. Depending on the particular application and implementation, the invention is applicable for use with a multitude of types and varieties of codes including different phases of the same code. Examples include but are not limited to PN codes such as used in IS-95, Gold sequences and complex Gold sequences used in W-CDMA and cdma2000, channelization codes, OVSF codes, Walsh or Hadamard codes, scrambling codes, etc.

Throughout this document the term nominal sampling rate is defined as the basic chip rate of a spread spectrum signal. The sample rate is defined as the actual input sample rate which typically comprises an over-sampling rate or fractional space chip rate. For example a number of samples N may be generated within each chip period. The N fractional spaced samples are input at the sample rate which is N times the nominal sample rate or basic chip rate. The effective sample rate is the sample rate gated against a SAMPLE ENABLE signal whereby E<N samples per chip period are to be correlated. The effective sample rate is then E times the nominal sample rate.

To aid in illustrating the principles of the present invention, the reduced complexity correlator is described in the context of a rake receiver in a CDMA spread spectrum communications system. Note that the invention is not limited to this communications system, as one skilled in the communication arts can apply the correlator of the present invention to other communication systems and modulations without departing from the spirit and scope of the present invention.

Reduced Complexity Correlator with Over Sampled Input with Single Code

Figure 2:
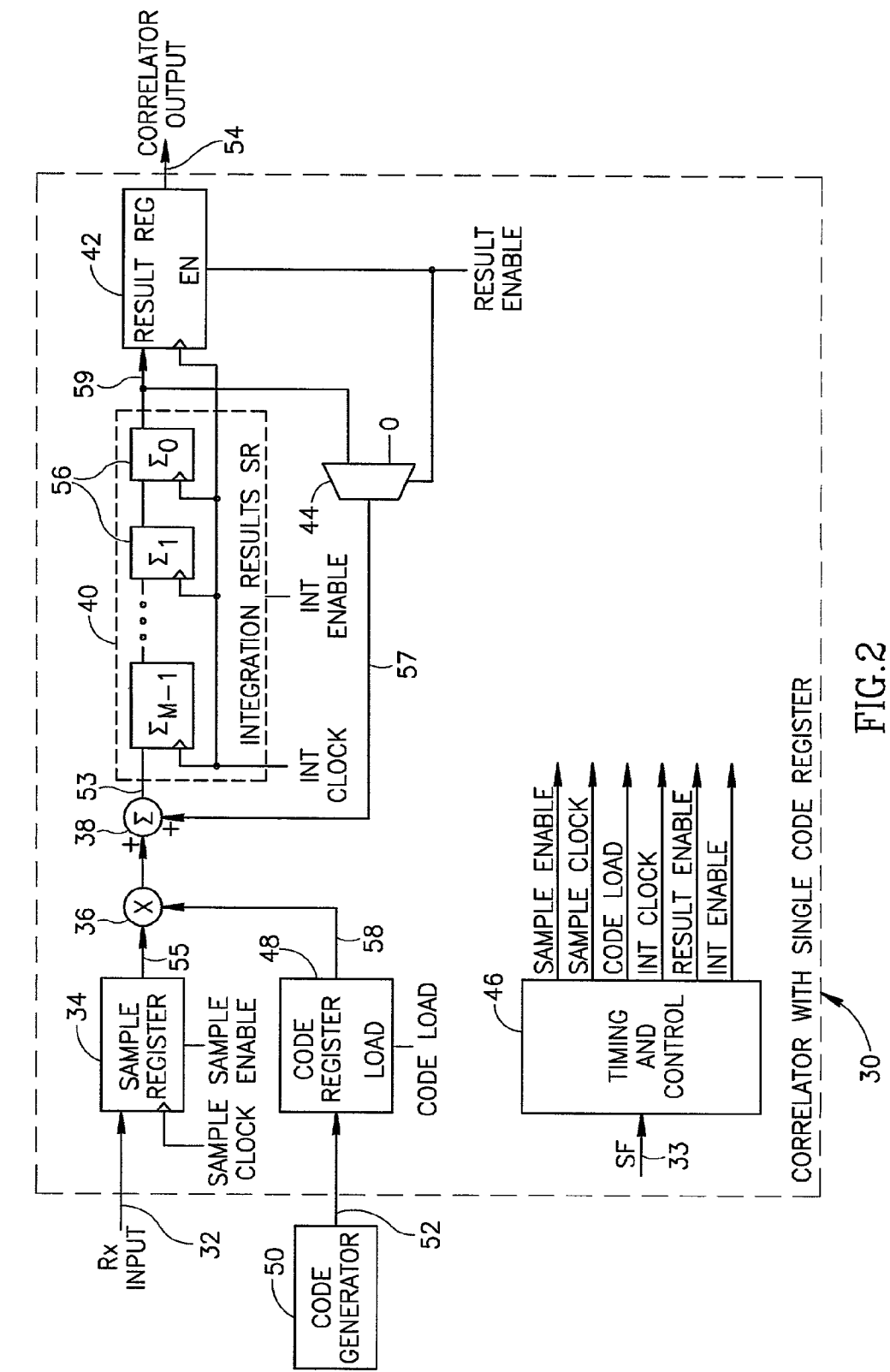
FIG. 2 is a block diagram of a first embodiment of the correlator of the present invention incorporating a single sample register and a single code register.

A block diagram of a first embodiment of the correlator of the present invention incorporating a single sample register and a single code register is shown in FIG. 2. In this embodiment, the correlator, generally referenced 30, is adapted to correlate an input receive signal sampled at an over-sampling rate with a single code wherein multiple correlations are performed for each over-sampling phase within the nominal sample period. Separate integration result registers are employed to store the individual correlation sums.

The Rx input 32 comprises received signal samples provided by a receiver front end. The input samples are clocked into a sample register 34 via a SAMPLE CLOCK. A SAMPLE ENABLE signal determines the clock cycles in which a new input sample is clocked into the sample register. The sample register receives data at the over-sampling clock rate R which is R times the nominal sample rate. The SAMPLE ENABLE signal determines the number of samples E during the nominal sample time (i.e. basic chip time) actually clocked in resulting in an effective sampling rate of E times the nominal sample rate.

The code, provided by a code generator 50, is loaded into a code register 48 in accordance with a CODE LOAD signal. A new code is loaded every nominal sample period, i.e. at a rate R times the nominal sample rate. The output 55 of the sample register and the output 58 of the code register are input to a multiplier 36 which functions to multiply the values at its input. The resultant product is input to adder 38 which functions to add the multiplication product with the correlation sum accumulated up to this point. The resultant sum 53 is clocked into an integration results shift register 40. In this and other correlator embodiments, the multiplier may be adapted to multiply hard-limited 1-bit versions of the input signal.

The integration results shift register comprises an M-stage shift register wherein each register 56 is adapted to store the intermediate correlation sums. The number of registers M required in this case is equal to the effective over sampling ratio $E \leq R$. The shift register is clocked by an integration clock (INT CLOCK) enabled by an INT ENABLE signal, which together generate the same rate as the effective sampling rate. The output 59 of the last stage of the shift register is fed back to the adder at the proper time to accumulate the next correlation product. Note that in the case where all the over-samples in a chip period are to be correlated, the SAMPLE ENABLE signal is not required. The number of result shift registers M=R and the INT CLOCK rate is R times the nominal sample rate.

The integration results are appropriately ordered in addition to the appropriate clocking of the sample, code and integration results shift register such that the integration result currently being fed back to the adder corresponds to the multiplication result currently being input to the adder. Thus, each sample is sequentially multiplied by the code and a separate correlation sum is calculated for each over-sampling input sample. As correlation sums are accumulated, they are shifted hack into the first stage of the integration results shift register.

The integration process is halted at the end of the symbol by clearing the particular integration register by applying a zero value at the input to the adder rather than the contents of the register. Thus, the multiplication products of each of the first input samples of the subsequent symbol will be stored in the results shift register without any remnants from the previous correlation cycle. A multiplexer 44 is used to select between either the output of the last stage of the results shift register or the zero value in accordance with a RESULT ENABLE signal. The output of the multiplexer 57 makes up the second input to the adder.

Simultaneously with the clearing of the correlation sum, the final correlation sum is transferred to a result register 42 whose output 54 is applied to downstream processing stages. The result register is clocked with the same INT CLOCK as the results shift register but a value is only clocked in when the RESULT ENABLE signal is active.

A timing and control unit 46 provides the clocking and control signals required by the various components of the correlator. The duration of the correlation sum integration is determined by a spreading factor (SF) input 33 which may be provided by the code generator or other entity. The timing and control unit may be implemented using a state machine, discrete logic, etc. using well-known digital circuit design techniques. For example, the integration duration may be determined by a down counter, which is initialized in accordance with the spreading factor SF, e.g., initialized with the value SF-1. When the down counter reaches its terminal count of zero, the contents of the results shift register are sequentially output to the results register.

A suitable application of this embodiment is as the correlator for a single rake finger where the samples are received at an effective over sampling rate $E \leq R$ times the nominal SAMPLE CLOCK rate. In this case, the SAMPLE ENABLE signal is active in accordance with the number of phases to be correlated and only a single code is used. The code register operates at the slower nominal sample clock rate. For each code loaded, E correlations are performed, each with a different over-sampling phase. The E results per chip period are stored in the E-stage integration results shift register during the correlation process which is clocked at the clock rate equal to the effective sampling rate. When integration is complete, the correlations results in the results shift register are sequentially clocked out to the results register where they are input to subsequent processing stages.

Reduced Complexity Correlator with Over Sampled Input with Multiple Codes

Figure 3:
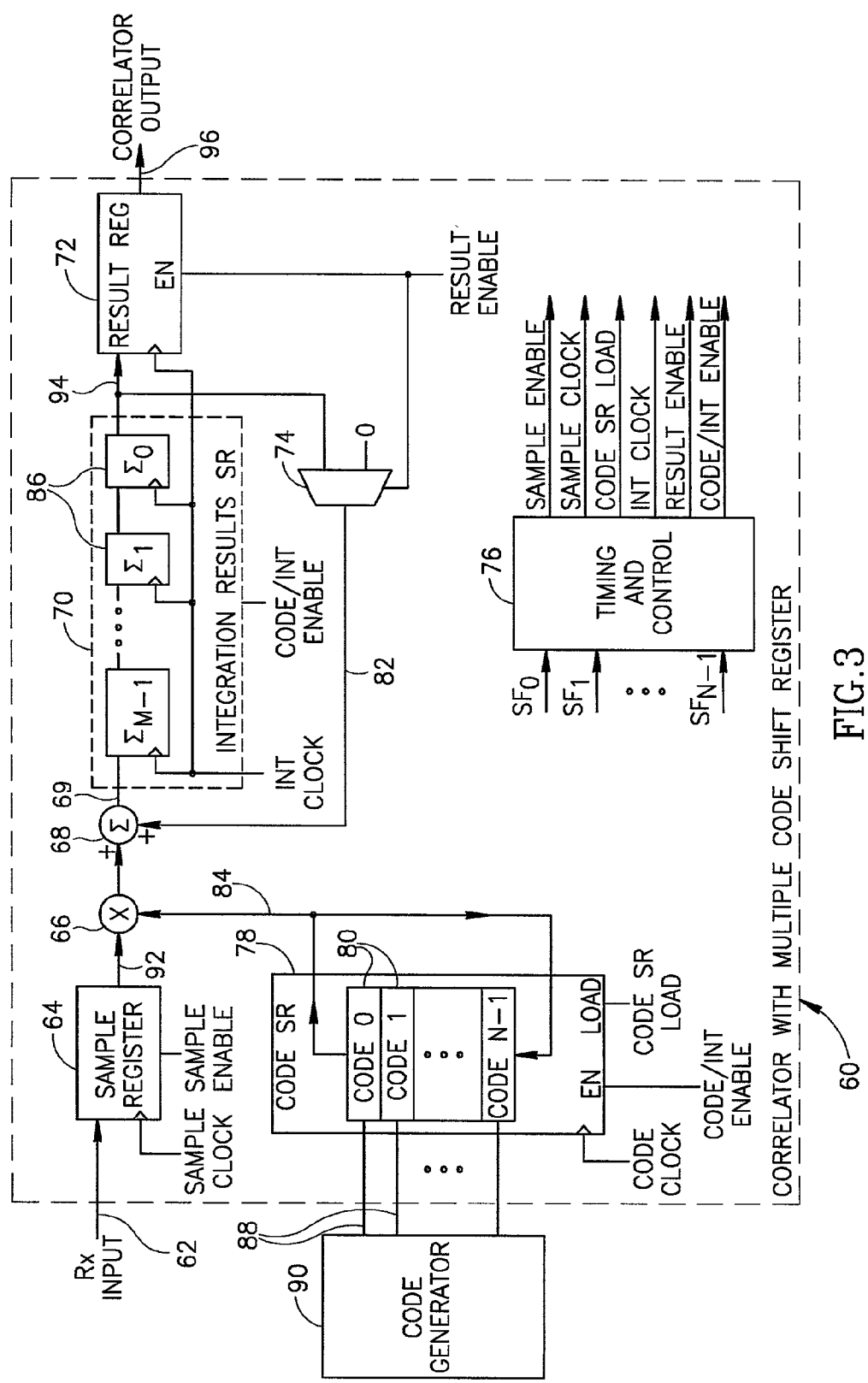
FIG. 3 is a block diagram of a second embodiment of the correlator of the present invention incorporating a single sample register and a circular code shift register.

A block diagram of a second embodiment of the correlator of the present invention incorporating a single sample register and a circular code shift register is shown in FIG. 3. This embodiment is capable or performing multiple correlations with an over-sampling receive signal with multiple codes. It is similar in constriction and operation to the correlator of FIG. 2 described infra. The codes are stored within a circular shift register that is clocked at a sufficiently high rate such that each input sample is multiplied with all codes. A corresponding number of integration result registers are used to accumulate and store a plurality of correlation sums.

The Rx input samples 62 are clocked into a sample register 64 via a SAMPLE CLOCK against a SAMPLE ENABLE signal. The sample register receives data at the over-sampling clock rate R which is R times the nominal sample rate. The SAMPLE ENABLE signal determines the number of samples E during the nominal sample time (i.e. basic chip time). Actually, the samples are clocked in at the resulting effective sampling rate of E times the nominal sample rate.

A number N of codes, provided by code generator 90, are parallel loaded into a circular code shift register 78 in accordance with a code shift register load signal. A new set of N codes is loaded every nominal sample period. The code shift register is clocked at a rate N times the effective sampling clock rate against a CODE/INT ENABLE signal, thus permitting the correlation of fewer then N codes per chip cycle. Assuming all N codes are used and R over-samples per chip are used, the CODE CLOCK rate is E×N×(nominal clock rate). In this case, for every input sample, the contents of the code shift register are circularly shifted one complete revolution, i.e. the code 0 value is circularly shifted until it returns to its starting location. The number of actual correlations performed per chip period may be less than R depending on the effective rate as determined by R and the SAMPLE ENABLE signal.

The output 92 of the sample register and the output 84 of the last stage of the code shift register multiplied by multiplier 66. The resultant product is input to adder 68 which functions to add the multiplication product with the correlation sum accumulated up to this point corresponding to the particular input sample and code. The resultant sum 69 is clocked into an integration results shift register 70.

The integration results shift register comprises an M-stage shift register wherein each register 86 is adapted to store the intermediate correlation sums. The number of registers M required in this case is equal to E×N, i.e. the effective over-sampling ratio times the number of codes. The results shift register is clocked by an integration clock (INT CLOCK) against the CODE/INT ENABLE signal. In this case, the CODE CLOCK and INT CLOCK are the same rate, i.e. E×N×(nominal clock rate). In the case of E<R, one or more INT clock cycles are disabled each chip cycle. The output 94 of the last stage of the shift register is fed back to the adder at the proper time to accumulate the correlation product corresponding to that sample and code being multiplied.

The sample, code shift register and integration results shift register are clocked such that the integration result currently being fed back to the adder corresponds to the multiplication result currently being input to the adder. Thus, each sample is sequentially multiplied by each code and a separate correlation sum is calculated for each input sample for each code. After correlation sums are updated by the adder, they are shifted back into the first stage of the integration results shift register.

The integration process is halted at the end of the symbol by clearing the particular integration register via a multiplexer 74 adapted to select between either the output of the last stage of the results shift register or a zero value in accordance with a RESULT ENABLE signal. The final correlation sum is transferred to a result register 72 whose output 96 is applied to downstream processing stages. The result register is clocked with the same INT CLOCK as the results shift register but values are stored in accordance with the RESULT ENABLE signal.

A timing and control unit 76 provides the clocking and control signals required by the various components of the correlator. The timing and control unit may be implemented similarly as that of the timing and control unit 46 of FIG. 2. Note that each code may have a different spreading factor associated with it, meaning that the symbol time may be different for each code. The integration periods for the correlation sums are determined in accordance with N spreading factor inputs, $SF_0$ through $SF_{N-1}$. The integration process must therefore stop at different times for each code. The timing and control unit maintains separate circuitry, e.g., down counters, comparators, etc. to track the integration time for each code. When the correlation for a particular code is complete, the RESULT ENABLE signal is made active and the correlation sum is written into the results register while a zero is presented to the adder to initialize the correlation sum for the next correlation to be performed.

Thus, the correlation results are output to the results register in accordance with the particular integration time required for that correlation. The timing and control unit generates the RESULT ENABLE signal at the appropriate time based on the spreading factor value which may be the same or different for each code. The RESULT ENABLE signal is synchronized to correspond to the correlation sum currently in the last stage of the results shift register.

In one embodiment, the integration periods can be timed using a down counter for each code wherein the counter is initialized in accordance with the corresponding spreading factor. When the down counter reaches its terminal count of zero, the contents of the results shift register are sequentially output to the results register and a zero is input to the adder to zero out the current correlation sum as the first multiplication result of the next correlation is input to the adder.

A suitable application for this embodiment is its use in channel estimation wherein the sample register is enabled in one or more of the over-sampling phases whereby each sample is to be correlated with N codes. The N codes are parallel loaded into the circular code shift register. Using the SAMPLE ENABLE, the rate samples are loaded into the sample register is limited to the enable rate E. Both the code shift register and integration result shift register are clocked at a rate E×N×(nominal clock rate). For each of the N codes loaded, E correlations are performed, each with a different phase input sample. The correlation result sums are stored in the result shift register whose length is M=N×E. When the integration period for a code(s) is complete, the result(s) is sequentially clocked out to the results register.

Multiple Input Sample Streams

In another embodiment, the correlator is modified to correlate multiple input sample streams with multiple codes. The input samples are parallel loaded into a circular input sample shift register in similar fashion to the plurality of codes. The input samples and codes are circularly shifted out at a sufficiently high clock rate to multiply each input sample in the sample shift register with each code in the code shift register. The correlation sums are stored in an integration result shift register and clocked out when integration is complete. The sample shift register may be used in any of the correlator configurations described herein.

Figure 4:
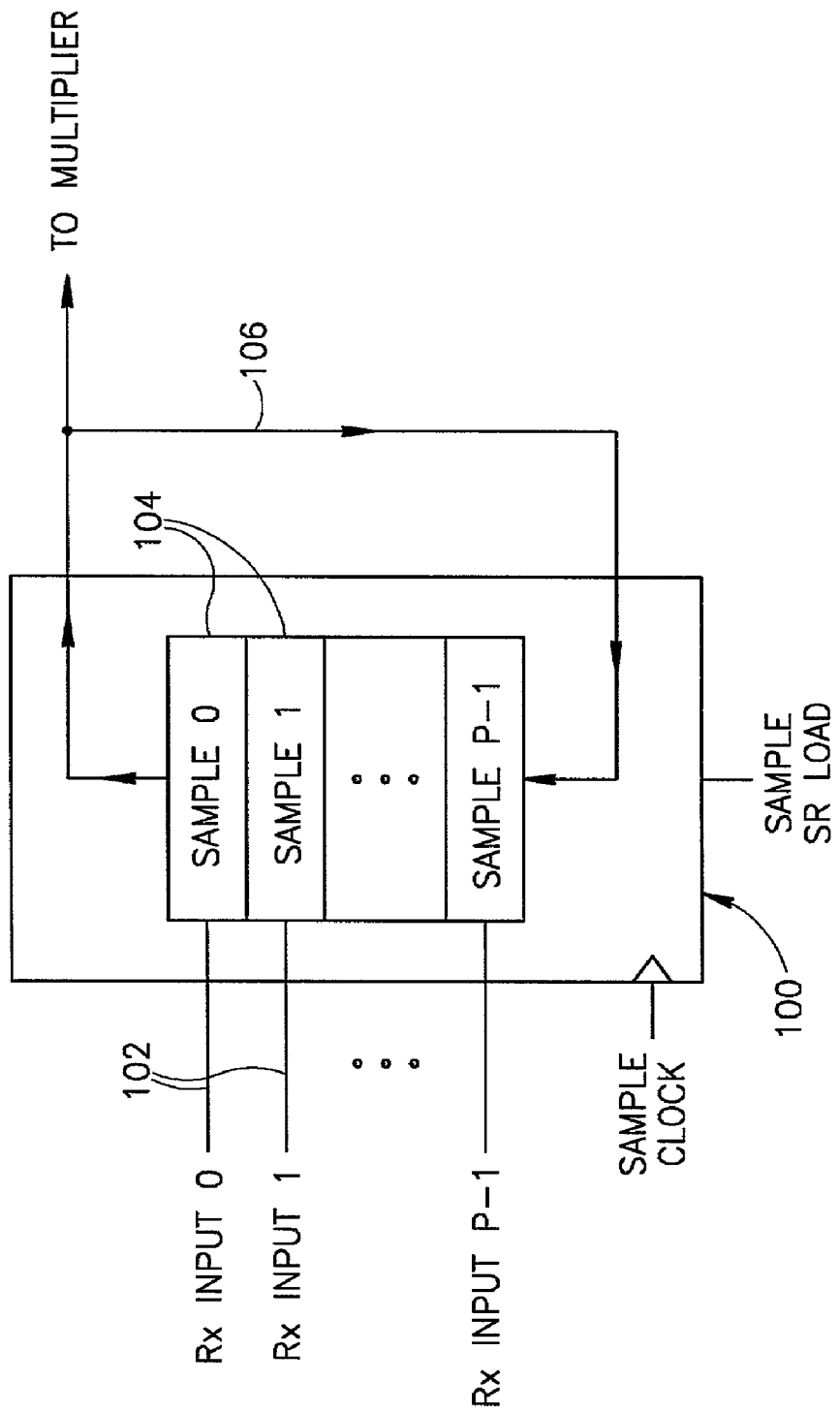
FIG. 4 is a block diagram illustrating a circular sample shift register to be used in place of the single sample register in the correlator of the present invention.

A block diagram illustrating a circular sample shift register to be used in place of the single sample register in the correlator of the present invention is shown in FIG. 4. The circular sample shift register 100 comprises a P-stage shift register wherein each stage 104 is adapted to hold an individual input sample. The P inputs 102, labeled Rx Input$_n$ through Rx Input$_{P-1}$ are parallel loaded into the sample shift register in accordance with the sample shift register load signal. The output 106 of the last stage of the sample shift register is fed back to its input stage and to the multiplier input. The contents are circularly shifted at the sample clock rate which is P times the nominal sample clock rate or the over-sampling clock rate in the case over-sampling is employed. The shift register is loaded at the nominal sample rate or the over-sampling rate if over-sampling is employed.

In operation, for each set of P input samples, the sample shift register is circularly shifted one whole revolution whereby each input sample is multiplied with each of N code values. In this case, the length M of the integration results shift register is increased to P×N or R×P×N in the case of an over-sampled input.

When the sample shift register is incorporated in the correlator, the shift clock rate for the circular code shift register and the integration results shift register must be increased by P times to compensate for the larger number of input samples that must be correlated within the same sample period. The shift clock rate becomes P×N×(nominal clock rate) or R×P×N×(nominal clock rate) in the case of over-sampled input.

Figure 5:
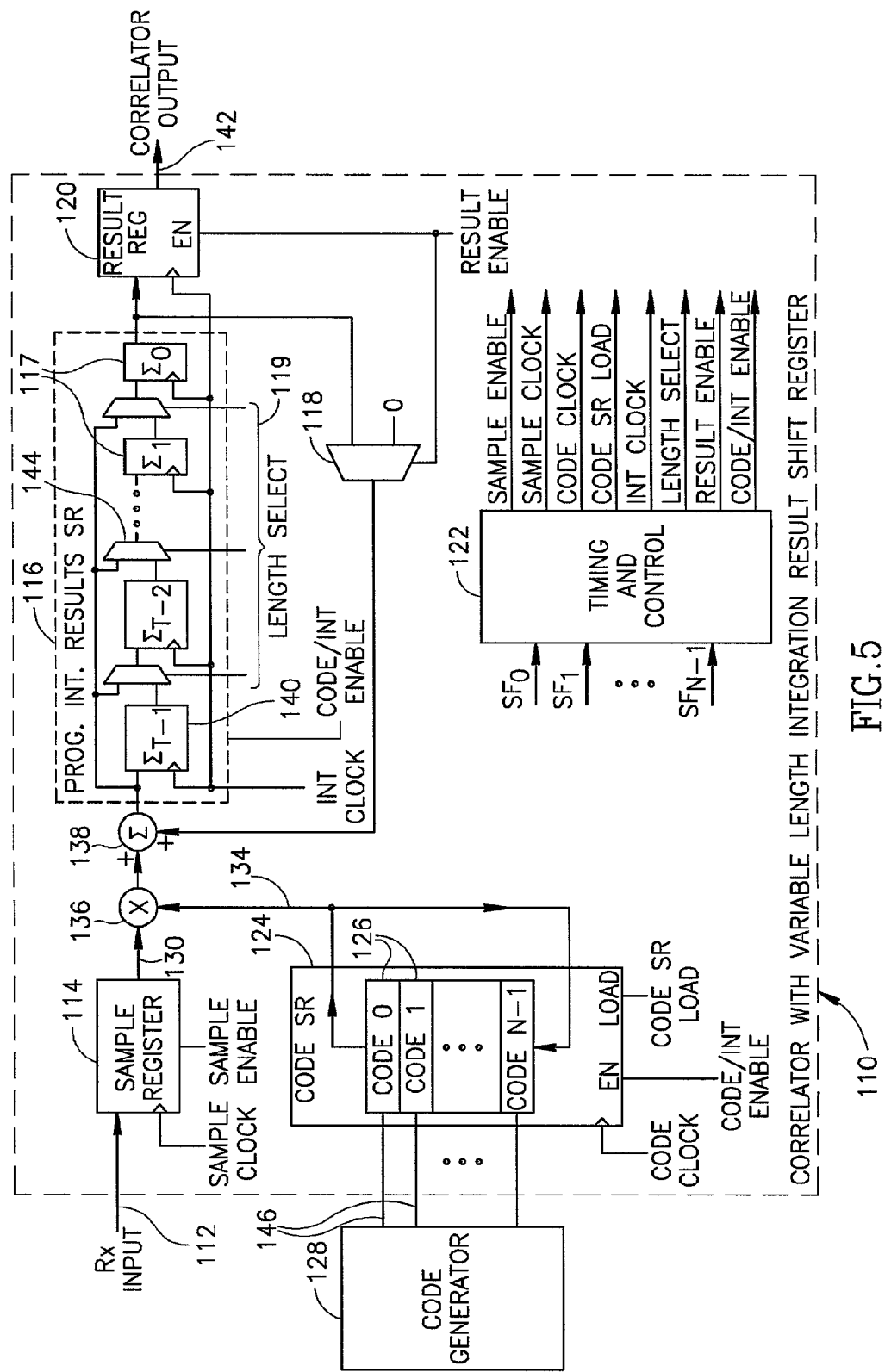
FIG. 5 is a block diagram of a third embodiment of the correlator of the present invention incorporating a single sample register, circular code shift register and programmable length integration result shift register.

Reduced Complexity Correlator with Over-Sampled Input with Multiple Codes and Variable Length Results Shift Register A block diagram of a third embodiment of the correlator of the present invention incorporating a single sample register, circular code shift register and programmable length integration result shift register is shown in FIG. 5. The construction and operation of the correlator of this embodiment is similar to that of FIG. 3 with the difference being that the M-stage integration shift register 70 is replaced with a T-stage programmable length integration results shift register 116. Each register stage 117 is adapted to store an accumulated correlation sum and is clocked by the INT CLOCK signal against the CODE/INT ENABLE signal.

The shift register 116 comprises T stages whereby one or more of the stages up to T may be selected to form and function as the results shift register. A 2 to 1 multiplexer is placed between each register 117 which selects either the output of the adder or the output of the previous register stage. The operating length of the results shift register can be set dynamically and is controlled by the length select signal 119 which comprises T-2 individual mux select signals. The timing and control unit 122 is adapted to provide the correct length select signal in accordance with the implementation requirements.

Using the programmable integration results register, the same correlator hardware can be re-used in more than one application regardless of the number of stages M required for the integration results shift register. For each application, the length select signal is set in accordance with the length required. Thus, for example, the same shift register can be used for any number P of input samples and any number of codes N without requiring hardware modifications.

Exemplary Timing Diagram

Figure 6:
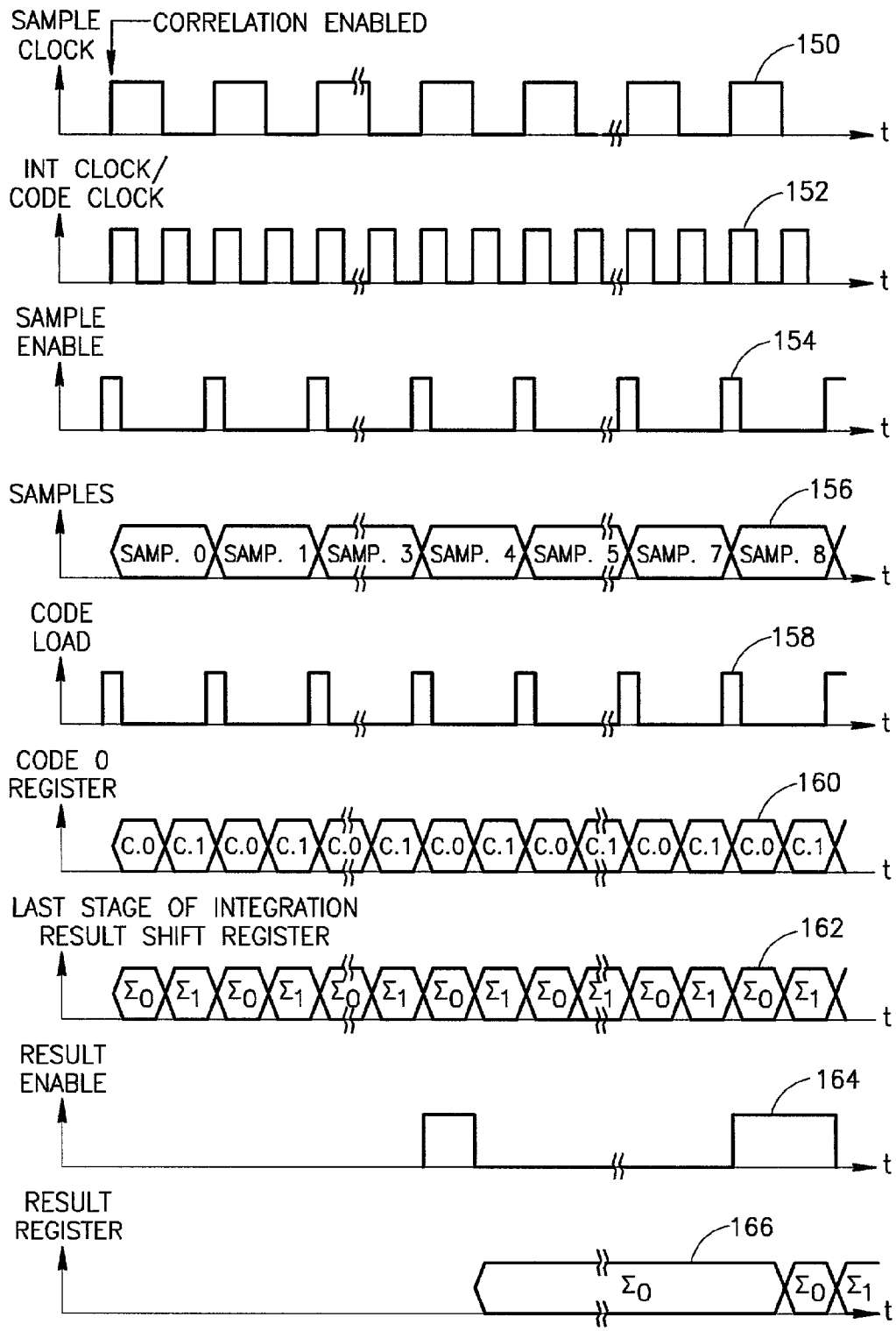
FIG. 6 is a timing diagram illustrating the timing relationship of the clock and control signals in the correlator.

To aid in illustrating the operation of the correlator of the present invention, an exemplary timing diagram is presented. A timing diagram illustrating the timing relationship of the clock and control signals in the correlator is shown in FIG. 6. The timing diagram is based on the correlator of FIG. 3 wherein two codes are employed, i.e. N=2, with the following spreading factors:
   code 0: SF=4
   code 1: SF=8

The CODE CLOCK input to the code shift register and the INT CLOCK input to the integration results shift register are the same and are shown in trace 152. The sample clock input to the sample register is shown in trace 150. The INT CLOCK and CODE CLOCKs are twice the rate as the SAMPLE CLOCK since there are N=2 codes to correlate with. The SAMPLE ENABLE, shown in trace 154, causes a new input sample to be stored every sample clock. The input sample data clocked into the sample register is shown in trace 156. A new set of codes is loaded into the code shift register every sample clock period as indicated by the CODE LOAD signal shown in trace 158. The contents output of the last stage of the code shift register as it is circularly shifted are shown in trace 160.

Each code clock cycle, the sample is multiplied with a code. The result is added with the corresponding correlation sum stored in the integration results shift register. The quantity added to the multiplication sum, i.e. the output of the last stage of the results shift register, is shown in trace 162. Thus, during the first cycle, codes is multiplied with the input sample and added with correlation sum $\Sigma_0$. The following cycle, $code_1$ is multiplied with the input sample and added with correlation sum $\Sigma_1$. The next sample is then loaded and the process repeats.

The timing and control unit generates the RESULT ENABLE signal (trace 164) to the results register every four sample clock cycles for codes and every eight sample clock cycles for $code_1$. The contents of the result register is shown in trace 166. At the sample 4 time, the correlation sum $\Sigma_0$ is input to the results register while a zero is simultaneously applied to the adder to clear the correlation sum. Thus, the correlation sum $\Sigma_0$ is not added to the multiplication product for sample 4. Similarly, at sample 8, correlation sum $\Sigma_0$ is output. At the next sample time, i.e. sample 9, the correlation sum $\Sigma_1$ is output to the result register in accordance with the spreading factor SF=8 for $code_1$.

W-CDMA Rake Receiver Incorporating Reduced Complexity Correlator

Figure 7:
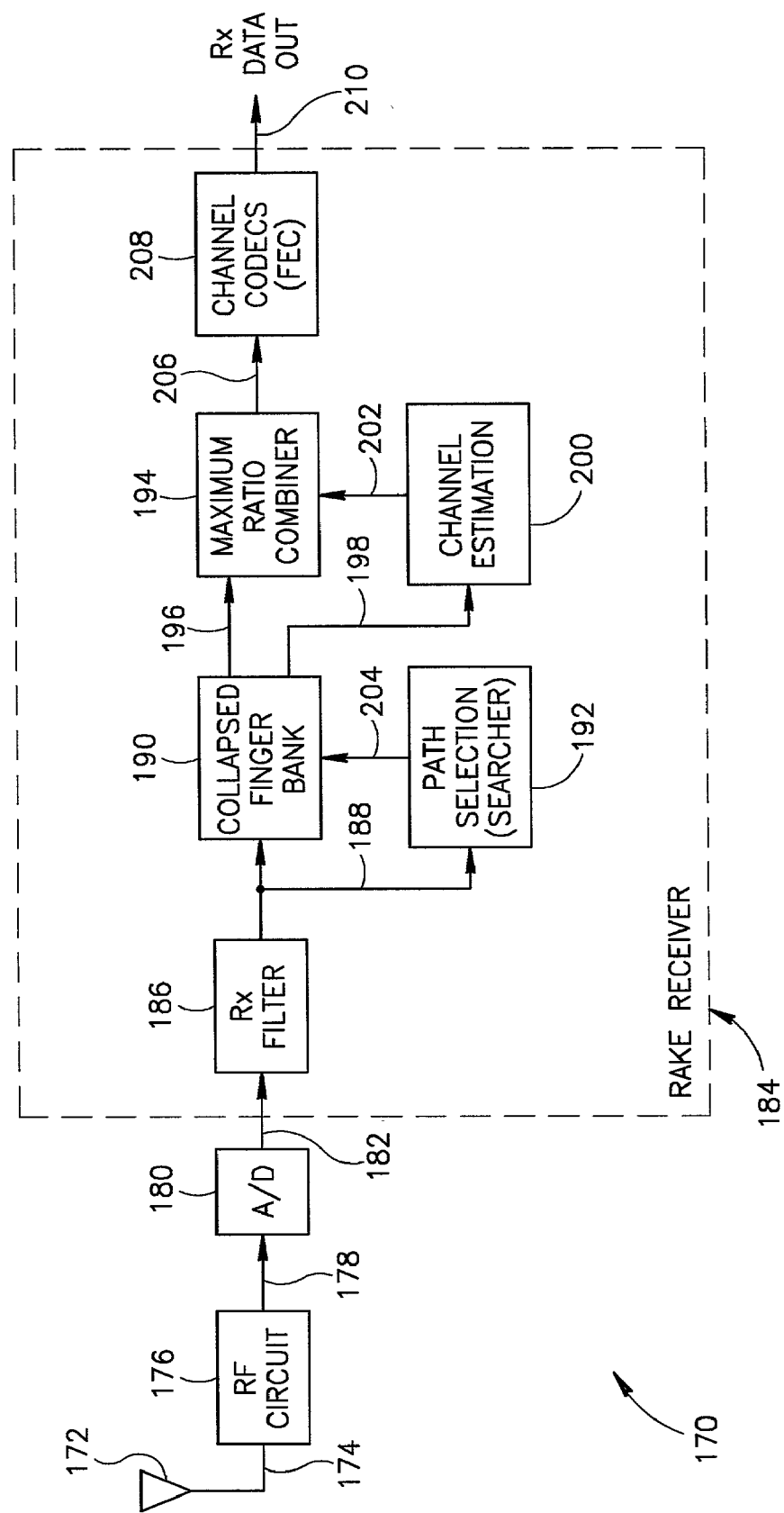
FIG. 7 is a block diagram illustrating an example CDMA rake receiver incorporating a collapsed the reduced complexity correlator of the present invention.

The reduced complexity correlator of the present invention may be incorporated within a communications device such as a W-CDMA mobile receiver, W-CDMA base station receiver, etc. A block diagram illustrating an example W-CDMA rake receiver incorporating the reduced complexity correlator of the present invention is shown in FIG. 7. A W-CDMA receiver, generally referenced 170, for use in a W-CDMA communications system is shown. The receive 170 comprises an antenna element 172, an RF front end circuit 176, an A/D converter 180 and a rake receiver unit 184. The rake receiver comprises an Rx matched filter 186, a collapsed finger bank 190 constructed using the reduced complexity correlator of the present invention, a path selection unit or searcher 192, a maximum ratio combiner (MRC) unit 194, a channel estimation unit 200 and a channel CODEC or forward error correction (FEC) unit 208. It is noted that although the W-CDMA receiver example presented herein is directed towards the receiver in the mobile unit, the principles of the present invention may be applied to other applications as well. The invention can be applied, for example, to the rake receiver in a W-CDMA base station receiver or to any other application that requires a plurality of correlations to be performed.

In operation, antenna 172 receives a spread spectrum RF signal transmitted by one or more W-CDMA base stations (not shown). RF front end circuit 176 receives the RF signal 174 from the antenna and processes it. Several functions are performed by the RF front end circuit depending on the particular implementation, including a first downconversion from RF to IF, band pass filtering (BPF) to reject out-of-band interference and noise, second downconversion from IF to baseband including splitting the signal into in phase and quadrature phase (i.e. I and Q) components and matched filtering to match the pulse shape of the transmitted signal. It is noted that subsequent processing is adapted to handle the complex output 178 of the RF front end circuit. The Rx output signal 178 is then converted to the digital domain by A/D converters 180.

The digitized Rx signal 182 is the input to the rake receiver 184. As discussed previously, the wide signal bandwidth (5 MHz in W-CDMA) provides robustness against fading (using frequency diversity), as the channel is unlikely to fade as a whole at any time instant. The high chip rate (3.84 MHz) provides a high temporal definition which enables better multipath isolation. A drawback of the larger bandwidth, however, is that the energy contained in any given multipath component is smaller, making the task of the rake receiver more difficult. The rake receiver typically must deal with several signal impairments all of which are time-varying, including multipath interference, multi-user interference (both inter-cell and intra-cell), transmission path fading and the near-far effect due to the relative position of mobiles and base station.

The rake receiver combats these signal impairments by the use of several techniques including channel estimation and tracking, maximum ratio combining to take advantage of multipath, multi-user detection schemes (e.g., interference cancellation or decorrelating receivers), fast power control based on signal-to-interference ratio (SIR) estimation and antenna diversity to provide another form of diversity (i.e. space-diversity) in addition to frequency diversity.

In contrast to a TDMA system using linear equalization wherein the receiver attempts to compensate for multipath in the channel using equalization techniques to remove the echo energy, CDMA systems use the energy contained in each echo to improve the signal-to-noise ratio (SNR). This can be done due to the fact that the spreading codes on the downlink yield reasonably good orthogonality between the signal and its delayed version. On the uplink, the orthogonality is achieved through the use of different scrambling codes for each mobile. Each mobile can then use any OVSF code from the tree. The rake receiver functions to combine the energy contained in each of the echoes. In the W-CDMA system, pilot bits are transmitted on dedicated channels which allow channel estimation and coherent combining (i.e. maximum ratio combining) of the different paths. Typically, a typical rake receiver in a W-CDMA communication system comprises three to six rake fingers.

Each finger receives both in-phase and quadrature-phase signal components 188 and is assigned to demodulate (i.e. de-spread) a separate multipath component of the RF signal. The assignment of the path selection 204 is made by the searcher 192 and input to the finger bank. Each finger functions to sample the received signal for early, on-time and late components. The timing of the early and late samples are adjusted (i.e. advanced and delayed) relative to the timing of the on-time samples by a delay time.

The fingers are represented by a finger bank 190. Each finger is a coherent receiver which uses a reference pilot channel for coherent detection. The on-time samples comprise both traffic data and pilot channel samples. In accordance with W-CDMA, the pilot channel may comprise either reference symbols embedded within traffic symbols or a separate continuous pilot signal transmitted on a separate physical channel. Each finger is operative to de-spread the early, on-time and late signals by correlating them with suitable spreading code sequences generated by code generators.

The correlators function to multiply the samples by the spreading codes and to accumulate the results using integrators. The correlator function for all the fingers are performed using the reduced complexity correlator of the present invention. Correlations for the early, on-time and late samples are obtained by adjusting the code to generate early, on-time and late code phases. This is equivalent to using the same code and using early, on-time and late receive samples. The correlator embodiment of FIG. 3 may be used whereby the N codes comprise the various phases of the code sequence the receive signal is to be correlated against.

In addition, a code tracking loop may be used to generate an adjustment signal based on the difference between the early and late samples derived from the traffic or pilot channel. A channel is properly estimated when the difference between the early and late samples is substantially zero. The tracking adjustment signal is applied to track the timing of the multipath component being demodulated by the finger thus accounting for changes in the timing of the multipath which may be caused by relative motion between the transmitter and receiver.

The searcher 192 is operative to search out different multipath phase components of the received signal transmitted using the code sequence assigned to the receiver. The timing of each finger is controlled such that it is correlated with a particular multipath found by the searcher and having a different delay. The searcher thus assigns each finger to a particular multipath by controlling its timing to coincide with arrival of the multipath.

The de-spread on-time symbols 196 from the finger bank are time aligned and combined in maximum ratio combiner (MRC) 194 which functions to generate a high quality output signal 206. The output signal effectively collects the energy from all the multipath components which were assigned to a finger. The output signal is then input to subsequent processing stages such as a channel decoder 208 which is adapted to decode (e.g., Viterbi decoding, turbo decoding, CRC, etc.) the received symbols and provide the Rx data output signal 210 of the receiver.

The de-spread pilot channel data is input to the channel estimation unit 200 which functions to periodically calculate and estimate of the channel. The channel estimate 202 is used by the MRC to optimally combine the data received from the plurality of fingers corresponding to the different multipath components. The accuracy of the channel estimate is most affected by multi-user interference and noise which work to degrade the signal to interference ratio (SIR).

Figure 8:
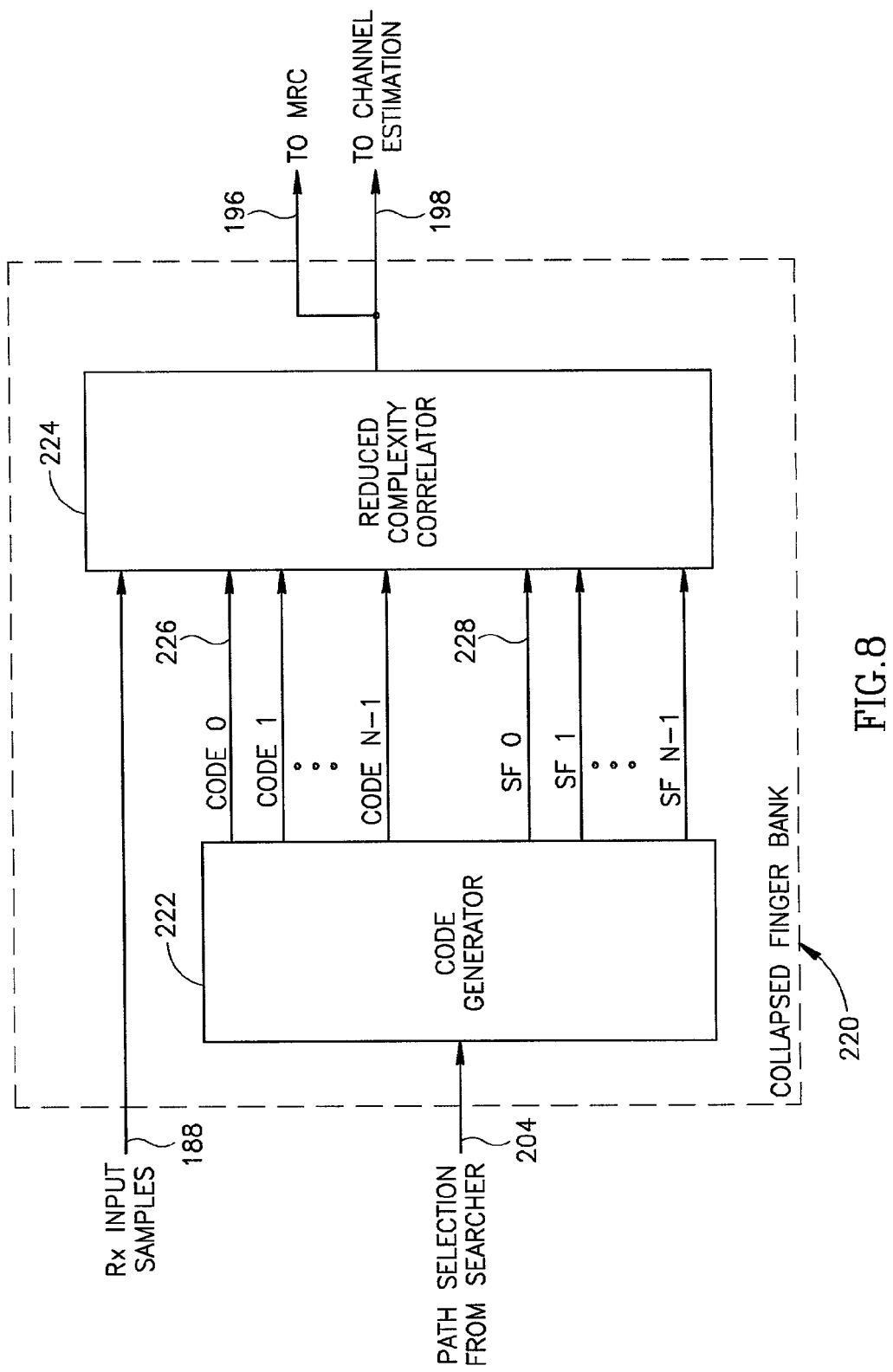
FIG. 8 is a block diagram illustrating the collapsed finger bank constructed in accordance with the present invention in more detail.

A block diagram illustrating the collapsed finger bank constructed in accordance with the present invention in more detail is shown in FIG. 8. As described supra, the finger bank in the rake receiver is implemented using the reduced complexity correlator of the present invention. This allows the plurality of finger banks to be 'collapsed' into a single unit.

The collapsed finger bank comprises a code generator 222 and reduced complexity correlator (RCC) 224 such as that described in connection with FIG. 3. In operation, the Rx input samples 188 are input to the RCC 224 while the N codes 226 ($code_0$ through $code_{N-1}$) are provided by the code generator 222. The code generator is adapted to generate all the codes required by the processing to be performed by each 'finger' in de-spreading the multipath assigned to it. The various codes are generated in accordance with the path selection signals 204 provided by the searcher. In addition, N spreading factors ($SF_0$ through $SF_{N-1}$) associated with each of the N codes are input to the RCC by the code generator or alternatively by the searcher. As described supra, the spreading factor information is used by the RCC to determine the integration length of each correlation. Correlation results associated with both the data traffic 196 and the pilot channels 198 are output to the MRC and channel estimation, respectively.

Using the RCC of the present invention enables a significant reduction in gate count in the implementation of the finger bank used in a W-CDMA rake receiver due to the reuse of the complex part including the multiplier and adder. The required correlations can be performed without requiring considerable additional hardware regardless of the number of correlations to be performed.

It is noted that the correlator apparatus and techniques described herein can be used not only as a correlator machine but as a general purpose Multiply and Accumulate (MAC) unit as well. Multiple quantities to be multiplied and accumulated are input to the MAC via the input sample shift registers and the code shift registers. The MAC results are accumulated in the result shift register and the results read out when accumulation is complete, as described supra. Examples of applications of the reduced MAC machine of the present invention include use in digital filters and in any application requiring that MAC operations be performed in hardware.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A correlator for correlating an input data signal with a code, for use in effectively realizing a plurality of fingers in a Code Division Multiple Access (CDMA) receiver, comprising:

a sample register adapted to store and output E input data samples every chip period of an input sample stream clocked at an over sampling ratio of R times a nominal sampling clock rate;

a single code register adapted to store and output a code value at said nominal sampling clock rate;

a single multiplier coupled to said sample register and said code register, said multiplier adapted to multiply the output of said sample register with the output of said code register;

a single adder adapted to add the output of said multiplier with a correlation sum output of the last stage of an M-stage integration result shift register and to produce an updated correlation sum therefrom;

said integration results shift register adapted to store M correlation sums wherein updated correlation sums output of said adder are shifted into said integration results shift register at said over-sampling clock rate such that the over-sampling phase of the correlation sum at the output of said integration results shift register corresponds to the correlation sum currently at the input to said adder; and wherein E, R and M are positive integers.

2. The correlator according to claim 1, wherein the code register is adapted to be loaded with a new code value once every R over sampling cycles.

3. The correlator according to claim 1, wherein the code register is loaded with code values output by a code generator.

4. The correlator according to claim 1, wherein the sample register, the code register, the multiplier, the adder and the integration result shift register are adapted to process and output complex values.

5. The correlator according to claim 1, wherein the effective over-sampling ratio E is equal to the number of shift register stages M.

6. A correlator for correlating input data samples with a plurality of codes, for use in effectively realizing a plurality of fingers in a Code Division Multiple Access (CDMA) receiver, comprising;

a sample register adapted to store and output input data samples at a first clock rate;

an N-stage circular code shift register adapted to store N code values and clocked at a second clock rate;
a single multiplier coupled to said sample register and said code shift register, said multiplier for multiplying input data samples with the code value output of the last stage of said code shift register, wherein said code shift register is circularly shifted such that each input sample is sequentially multiplied by each of N codes;
a single adder adapted to add the output of said multiplier with a correlation sum output of the last stage of an M-stage integration result shift register and to produce an updated correlation sum therefrom;
said integration results shift register adapted to store M correlation sums wherein updated correlation sums output of said adder are shifted into said integration results shift register at said second clock rate such that the correlation sum at the output of said integration results shift register corresponds to that of the correlation sum currently at the input to said adder; and
wherein N and M are positive integers.

7. The correlator according to claim 6, wherein the second clock rate is equal to N times the first clock rate.

8. The correlator according to claim 6, wherein the first clock rate is equal to a nominal sampling rate and wherein the number of integration result shift register stages M is equal to the number of code shift register stages N.

9. The correlator according to claim 6, wherein the first clock rate is equal to an over-sampling rate R times a nominal sampling rate and wherein the number of integration result shift register stages M is equal to the number of code shift register stages N times R, wherein R is a positive integer.

10. The correlator according to claim 6, wherein the sample shift register, the code shift register, the multiplier, the adder and the integration result shift register are adapted to process and output complex values.

11. The correlator according to claim 6, wherein the code shift register is adapted to be parallel loaded with N code values once every input sample interval.

12. The correlator according to claim 6, wherein the code shift register is adapted to be parallel loaded with N code values once every R over sampling intervals, wherein R is a positive integer.

13. The correlator according to claim 11 or 12, wherein the N code values are provided by a code generator.

14. The correlator according to claim 6, wherein the integration result shift register comprises T registers and selection means arranged such that a one or more of the T registers are selectably configured in accordance with a length selection signal to receive and store correlation sums output from the adder and to function as a shift register unit, and wherein T is a positive integer.

15. The correlator according to claim 14, wherein the selection means comprises T-1 multiplexers located between each integration result register and configured to output either the output of the adder or the output of the integration result register adjacent thereto in accordance with the length selection signal.

16. A take receiver for use in a Code Division Multiple Access (CDMA) spread spectrum communications system, comprising:
a radio frequency (RF) front end circuit for receiving a spread spectrum RF signal having a plurality of multipath components;
a searcher adapted to measure the multipath components of said RF signal and to generate one or more path selections in accordance thereto;
at collapsed finger bank for generating a plurality of demodulated signals from said RF signal in accordance with said path selections, said finger bank effectively realizing a plurality of fingers, said collapsed finger bank comprising:
a sample register adapted to store and output input data samples at a first clock rate;
an N-stage circular code shift register adapted to store N code values and clocked at a second clock rate;
a single multiplier coupled to said sample register and said code shift register, said multiplier for multiplying input data samples with the code value output of the last stage of said code shift register, wherein said code shift register is circularly shifted such that each input sample is sequentially multiplied by each of N codes;
a single adder adapted to add the output of said multiplier with a correlation sum output of the last stage of an M-stage integration result shift register and to produce an updated correlation sum therefrom;
said integration results shift register adapted to store M correlation sums wherein updated correlation sums output of said adder are shifted into said integration results shift register at said second clock rate such that the correlation sum at the output of said integration results shift register corresponds to that of the correlation sum currently at the input to said adder;
a results register adapted to store final correlation sums output of said integration results register and to output said final correlation sums as demodulated signals;
wherein N and M are positive integers;
a channel estimation unit adapted to generate channel estimates of one or more pilot signals; and
a combiner coupled to the output of said collapsed finger bank and adapted to combine said demodulated signals output therefrom to generate a receive data output signal in accordance with said channel estimates.

17. The receiver according to claim 16, further comprises a channel decoder adapted to decode the receive data output signal and to generate a decoded output signal therefrom.

18. The correlator according to claim 1 or 6, further comprises a result register coupled to the output of the last stage of the integration results shift register and adapted to sequentially store final correlation sums output therefrom.

19. The device according to claim 1, 6 or 16, further comprises timing means adapted to provide suitable timing, control and clock signals to the correlator.

20. The device according to claim 1, 6 or 16, further comprises means for zeroing out each individual correlation sum when integration thereof is complete.

21. The device according to claim 1, 6 or 16, wherein the zeroing means comprises a multiplexer adapted to select either the output of the last stage of the integration results shift register or a zero value in accordance with a result enable signal, wherein the result enable signal is active only when integration is complete.

22. The device according to claim 1, 6 or 16, further comprises counting means for determining when integration is complete for each correlation sum in accordance with a spreading factor input to the counting means.

23. The device according to claim 1, 6 or 16, further comprises means for simultaneously outputting and storing a final correlation sum sequentially in a results register and zeroing out each individual correlation sum when integration thereof is complete.

24. The device according to claim 1, 6 or 16, wherein the multiplier is adapted to multiply hard-limited 1-bit versions of the input signal.

25. The device according to claim 1, 6 or 16, wherein the code values are provided by a code generator adapted to output a non-binary code.

26. The device according to claim 1, 6 or 16, adapted to be implemented in an Application Specific Integrated Circuit (ASIC).

27. The device according to claim 1, 6 or 16, adapted to be implemented in a Field Programmable Gate Array (FPGA).

28. A method of correlating a first plurality of input data samples with a second plurality of codes to effectively realize a plurality of fingers in a Code Division Multiple Access (CDMA) receiver, said method comprising the steps of:

receiving and storing input data samples in an input sample register at a first clock rate;

receiving and storing N code values in a circular code shift register and outputting said code values at a second clock rate;

multiplying said input samples with the code value output of the last stage of said code shift register utilizing a single multiplier so as to generate multiplication results, wherein said code shift register is circularly shifted such that each input sample is sequentially multiplied by each of N codes;

adding each multiplication result to its corresponding correlation sum utilizing a single adder so as to generate updated correlation sums thereby;

storing M correlation sums in an M-stage integration result shift register and shifting said updated correlation sums output of said adder into said integration results shift register at said second clock rate such that the correlation sum at the output of said integration results shift register corresponds to that of the correlation sum currently being added; and wherein N and M are positive integers.

29. The method according to claim 28, adapted to be implemented in an Application Specific Integrated Circuit (ASIC).

30. The method according to claim 28, adapted to be implemented in a Field Programmable Gate Array (FPGA).

31. A multiply and accumulate (MAC) apparatus for multiplying two signals and accumulating the results thereof, comprising:

input storage means adapted to store and output first input samples;

second storage means adapted to store and circularly rotate a plurality of second input samples;

single multiplier means coupled to said first storage means and said second storage means and adapted to multiply the output of said input storage means by the output of said second storage means, wherein said second storage means is circularly rotated such that each first input sample is sequentially multiplied with said plurality of second input samples;

result storage means adapted to simultaneously store and output one or more MAC results in a first-in first-out manner;

single summing means adapted to add the output of said multiplier means with the MAC result output of said result storage means to produce an updated MAC result therefrom, said updated MAC result input to said result storage means; and wherein said second storage means and said result storage means are adapted such that the MAC product from said multiplier means present at a first input to said summing means corresponds to the MAC result output from said result storage means present at a second input to said summing means.

32. The device according to claim 31, wherein the multiplier means is adapted to multiply hard-limited 1-bit versions of the first input signals and the second input samples.

33. The apparatus according to claim 31, adapted to be implemented in an Application Specific Integrated Circuit (ASIC).

34. The apparatus according to claim 31, adapted to be implemented in a Field Programmable Gate Array (FPGA).

* * * * *